(12) United States Patent
Carlson

(10) Patent No.: US 6,857,596 B1
(45) Date of Patent: Feb. 22, 2005

(54) HIGH SPEED ELECTRO-OPTIC PAYOUT SYSTEM INCORPORATING A STATIONARY OPTICAL TERMINUS

(75) Inventor: Mark A. Carlson, Amherst, NH (US)

(73) Assignee: AE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/617,545

(22) Filed: Jul. 10, 2003

(51) Int. Cl.[7] .................................................. B64D 1/00
(52) U.S. Cl. ..................... 244/1 TD; 343/877; 342/9; 89/36.11; 89/36.16
(58) Field of Search .................... 244/1 TD; 343/877; 342/9; 89/36.11, 36.66, 36.16

(56) References Cited

U.S. PATENT DOCUMENTS

| | | | |
|---|---|---|---|
| 2,085,585 A | * 6/1937 | Hamilton | 343/707 |
| 3,419,874 A | * 12/1968 | Moorehead | 343/877 |
| 3,987,746 A | 10/1976 | McCulloh | |
| 4,808,999 A | 2/1989 | Toman | |
| 4,852,455 A | * 8/1989 | Brum | 89/1.14 |
| 4,978,086 A | * 12/1990 | Spicer | 242/378 |
| 5,014,997 A | 5/1991 | Smith et al. | |
| 5,020,742 A | 6/1991 | Haslim | |
| 5,029,773 A | 7/1991 | Lecat | |
| 5,094,405 A | 3/1992 | Brum | |
| 5,102,063 A | * 4/1992 | Brum | 244/1 TD |
| 5,136,295 A | 8/1992 | Bull et al. | |
| 5,333,814 A | 8/1994 | Wallis | |
| 5,501,411 A | 3/1996 | Brum et al. | |
| 5,570,854 A | 11/1996 | Brum et al. | |
| 5,603,470 A | 2/1997 | Fitzgerald et al. | |
| 5,605,306 A | 2/1997 | Fitzgerald et al. | |
| 5,836,535 A | 11/1998 | Brum | |
| 6,055,909 A | * 5/2000 | Sweeny | 102/336 |
| 6,056,236 A | * 5/2000 | Weimer et al. | 244/1 TD |

OTHER PUBLICATIONS

U.S. Provisional application No. 60/428,156, Dion et al., filed Nov. 21, 2002.
U.S. Appl. No. 10/027,325, filed Dec. 20, 2001, Carlson et al.
U.S. Appl. No. 10/105,716, filed Mar. 25, 2002, Carlson et al.
U.S. Appl. No. 10/027,352, filed Dec. 20, 2001, Carlson et al.

* cited by examiner

Primary Examiner—Teri Pham Luu
Assistant Examiner—Stephen Holzen
(74) Attorney, Agent, or Firm—Michael Sand; Daniel J. Long

(57) ABSTRACT

A system and apparatus for deployment of a decoy from a moving object, such as an aircraft, to protect the aircraft from an enemy missile. The decoy is stored in a housing mounted on the aircraft and is connected by a cable containing fiber optics and high voltage conductors. The cable is stored on a spool which is reciprocally moveable along a rotating shaft provided with a double helix and which is located coaxially within an outer rotatable de-bailer. The cable is drawn through a passage formed in an outer cylindrical side wall and end wall of the de-bailer as the decoy is deployed from the aircraft. The cable causes the de-bailer to rotate about the spool which reciprocates back and forth along the double helix shaft. The spool is connected to the helix of the shaft by a pawl and a brake mechanism controls the rotational speed of the shaft, and thus the payout speed of the cable. The control cable extends continuously from the decoy to a stationary terminus at the aircraft avoiding the use of a fiber optic rotary joint or slip ring technology heretofore required.

26 Claims, 3 Drawing Sheets

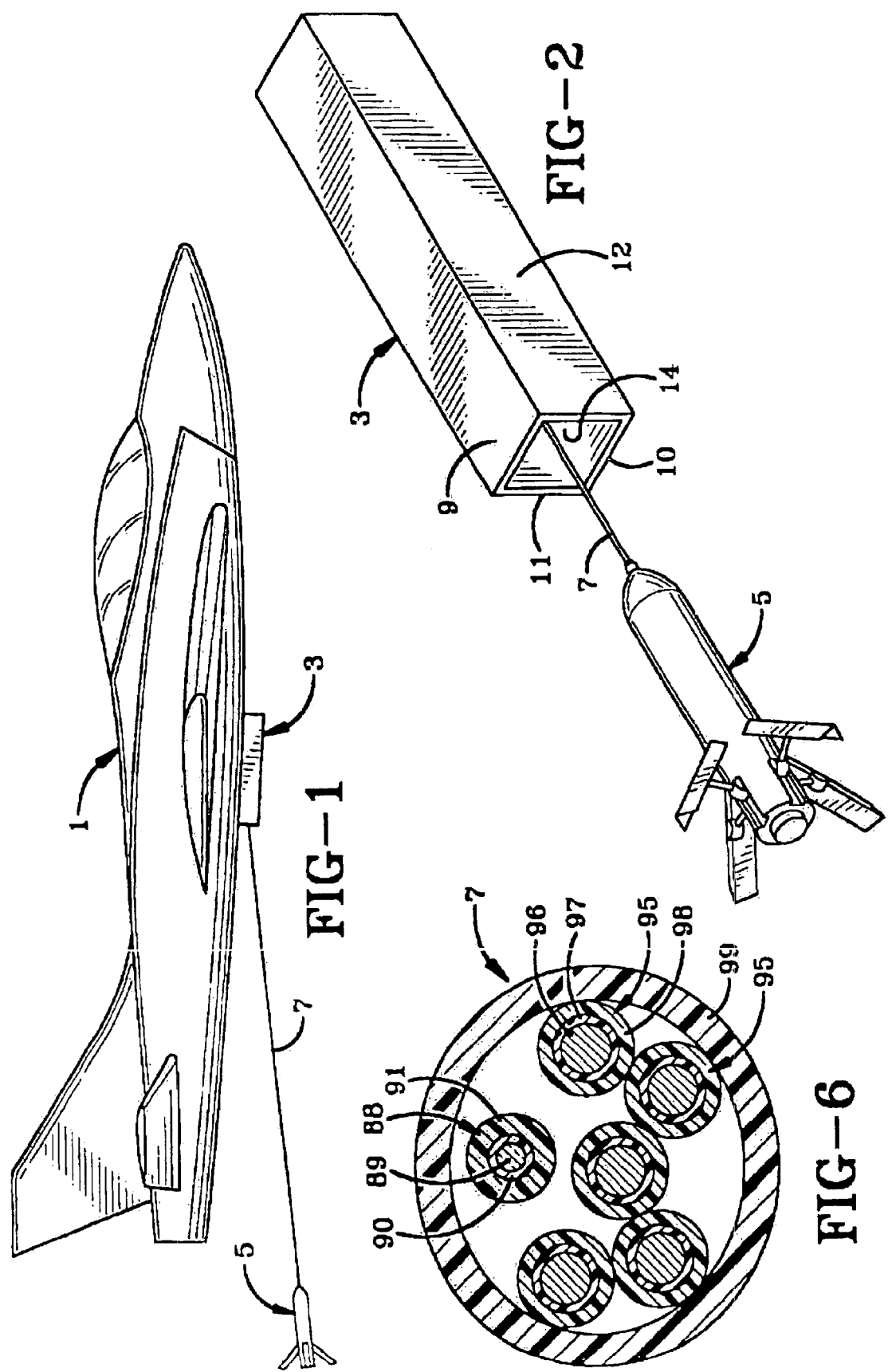

HIGH SPEED ELECTRO-OPTIC PAYOUT SYSTEM INCORPORATING A STATIONARY OPTICAL TERMINUS

BACKGROUND OF THE INVENTION

1. Technical Field

The invention relates to towed vehicles and particularly to a system and apparatus for deploying a decoy for protection of an aircraft, and even more particular, to such a system in which the decoy is towed by an electro-optical cable having a stationary terminus at the aircraft.

2. Background Information

Aerial towed objects are used for a variety of purposes, including decoys, testing, and scientific investigations. In one embodiment, the decoys are used to draw various types of guided weapons, such as missiles, away from an aircraft that the weapons are intended to destroy. These towed targets and decoys contain various types of electronic circuits to create an apparent target to a weapon which attracts the weapon to the decoy rather than the aircraft. One such electronic circuit has a traveling wave tube amplifier and antennas to which high voltages must be applied to power the traveling wave tube. Additionally, other controls for the traveling wave tube or other electronics in the towed object are transmitted along a fiber optic transmission line, which is both fragile and frangible.

In one type of deployment system, the decoy is simply cut loose after it has fulfilled its function. In this case, the fiber optic wires and the high tension line are severed, with the severing taking place after the high voltage has been removed and after all usable signals along the fiber optic cable have been terminated. In other types of deployment systems the decoy is retrieved by various mechanisms, such as shown in pending application Ser. No. 10/027,325, filed Dec. 20, 2001; Ser. No. 10/105,716, filed Mar. 25, 2002; and Ser. No. 10/027,352, filed Dec. 20, 2001.

By way of further background, the types of decoys involved have included devices which counter-measure infrared guided and radar guided missiles that pose the primary threats to military aircraft engaged in a combat environment. It will be appreciated that these missiles use their radar guidance systems to get within striking distance of the aircraft, thereby substantially increasing their probability that the IR system on the missile will be able to lock onto the target.

Current military aircraft are vulnerable to attack from IR-guided surface-to-air and air-to-air missiles. Statistical data on aircraft losses in hostile actions since 1980 show that almost 90 percent of these losses have been the result of IR-guided missile attacks. As a result, the ability to deploy decoys that can counter-measure both the RF and IR guidance systems on these missiles is of great value to protect aircraft during combat situations. As mentioned above, the IR-guided system initially utilizes radar guidance and then switches over to IR guidance as they come into closer proximity to the target. If one can counter-measure the radar system, then the IR portion can never lock onto the particular infrared target. To do this, the missile is deflected away by generating a signal that causes the radar guidance system in the missile to think that the target is actually elsewhere than it actually is. Furthermore, a decoy containing a laser countermeasure controlled via fiber-optic link can counter an IR missile should the radar guidance not be sufficiently interrupted.

Since these towed decoys require fiber optic wires and high tension voltages lines in order to supply the power and jamming signals to the decoys, it requires a cable capable of delivering such voltage and fiber optic signals. Heretofore, this required a fiber optic rotary joint or slip ring technology in order to transfer the signal and voltages from the source aircraft to the cable, which when deployed is unwound from a spool contained in the aircraft. This can result in problems both from the payout velocity and reliability due to its inability to perform rapid deployment to length and to the required relatively large rotary joints and high voltage slip rings required which can fail to be within the volume constraints imposed on such a system. Thus, these prior systems requiring the fiber optic and high voltage cables lack an efficient manner to provide a satisfactory connection between the cable being unwound from a reel and its stationary connection at the aircraft in a compact assembly. Thus, there is a need for a compact launching system for decoys with an improved payout system which uses an electro-optic cable with a stationary optical terminus at the aircraft eliminating the heretofore used rotary joint or slip ring technology.

Some prior art decoys are sacrificed and the towline cable is cut at the aircraft at the end of flight or mission. Thus, these systems do not require the winching in or reeling in of the decoy after deployment and passing of a missile attack. This enables the decoys to be rapidly deployed. One rapid deployment system includes a spindle that pays out the towline in much the same way as a spinning reel pays out a fishing line. Although spinning reel-like techniques have existed for fishing, in the area of rapidly deployed decoys they were not used to winch decoys.

U.S. Pat. Nos. 5,836,535; 5,603,470; 5,605,306; 5,570,854; 5,501,411; 5,333,814; 5,094,405; 5,102,063; 5,136,295; 4,808,999; 4,978,086; 5,029,773; 5,020,742; 3,987,746; and 5,014,997 cover in general, other types of towed vehicle deployment all incorporated herein by reference. In none of these patents is the use of a stationary optical terminus shown or taught as that of the present invention.

BRIEF SUMMARY OF THE INVENTION

The system and apparatus of the present invention provides for the rapid deployment of a decoy from a moving object, such as an aircraft, which is connected to the aircraft by a cable containing high voltage and fiber optic conductors to provide radar jamming signals to the decoy for disrupting the flight of a weapon, such as a missile, being guided to the aircraft by radar or other guidance signals, and in particular, wherein the electro-optical cable which supplies both the electric voltage and fiber optic signals, is connected to a stationary terminus within the aircraft, without the use of fiber optic rotary joints, slip ring technology, or other moving components.

Another aspect of the invention is to provide the system with an ejection device which rapidly deploys the decoy from its housing, which subsequently unwinds the cable from a spool containing a length of the electro-optical cable by rotating an outer, generally cylindrical or cup-shaped de-bailer about the cable supply spool, and wherein the cable passes through a passage in the de-bailer outer housing and through an end discharge opening thereof.

Another feature of the invention is to mount the cable supply spool in a non-rotational manner on a double helix rotatable shaft which reciprocates the spool along the shaft for removal of the cable from the spool, and wherein a brake mechanism is operatively connected to the rotatable shaft to control its rotational speed and consequently the payout speed of the cable from the spool reciprocally mounted on the shaft.

Another aspect of the invention is to provide for a rapidly deployed cable severing mechanism for severing the cable to disengage the decoy from the aircraft after it has performed its intended function.

BRIEF DESCRIPTION OF THE DRAWINGS

A preferred embodiment of the invention, illustrative of the best mode in which applicant contemplates applying the principles, is set forth in the following description and is shown in the drawings and is particularly and distinctly pointed out and set forth in the appended claims.

FIG. 1 is a diagrammatic view of an aircraft, with a decoy being deployed therefrom;

FIG. 2 is an enlarged diagrammatic perspective view showing the decoy being deployed from a housing shown removed from the aircraft of FIG. 1;

FIG. 6 is an enlarged fragmentary sectional view of the electro-optic cable for connecting the decoy to a stationary terminus within the aircraft.

Similar numerals refer to similar parts throughout the drawings.

DETAILED DESCRIPTION OF THE INVENTION

FIG. 1 illustrates one type of aircraft indicated at 1, in which the improved payout system and apparatus of the present invention can be utilized. The payout system and apparatus includes a housing 3 which can have a rectangular shape as shown in FIG. 2, or other configurations without affecting the invention. Housing 3 preferably is located beneath and is attached to the body of the aircraft at a location generally adjacent the armament mounted thereon. A decoy is generally indicated at 5, and is connected to the deployment apparatus by an electro-optic cable 7. Decoy 5 can have various constructions, and preferably contains various electronic circuitries and apparatus which sends out various jamming signals to confuse the control signals supplied to an incoming missile intended to strike the aircraft. In order to provide decoy 5 with the desired radar or other missile control jamming signals, cable 7 requires a source of voltage as well as fiber optics to supply various signals thereto. One example of cable 7 is shown in FIG. 6 and is described in greater detail below, and can be of a type described in pending patent application Ser. No. 60/428,156, filed Nov. 21, 2002, the contents of which are incorporated herein by reference.

Figure 3:
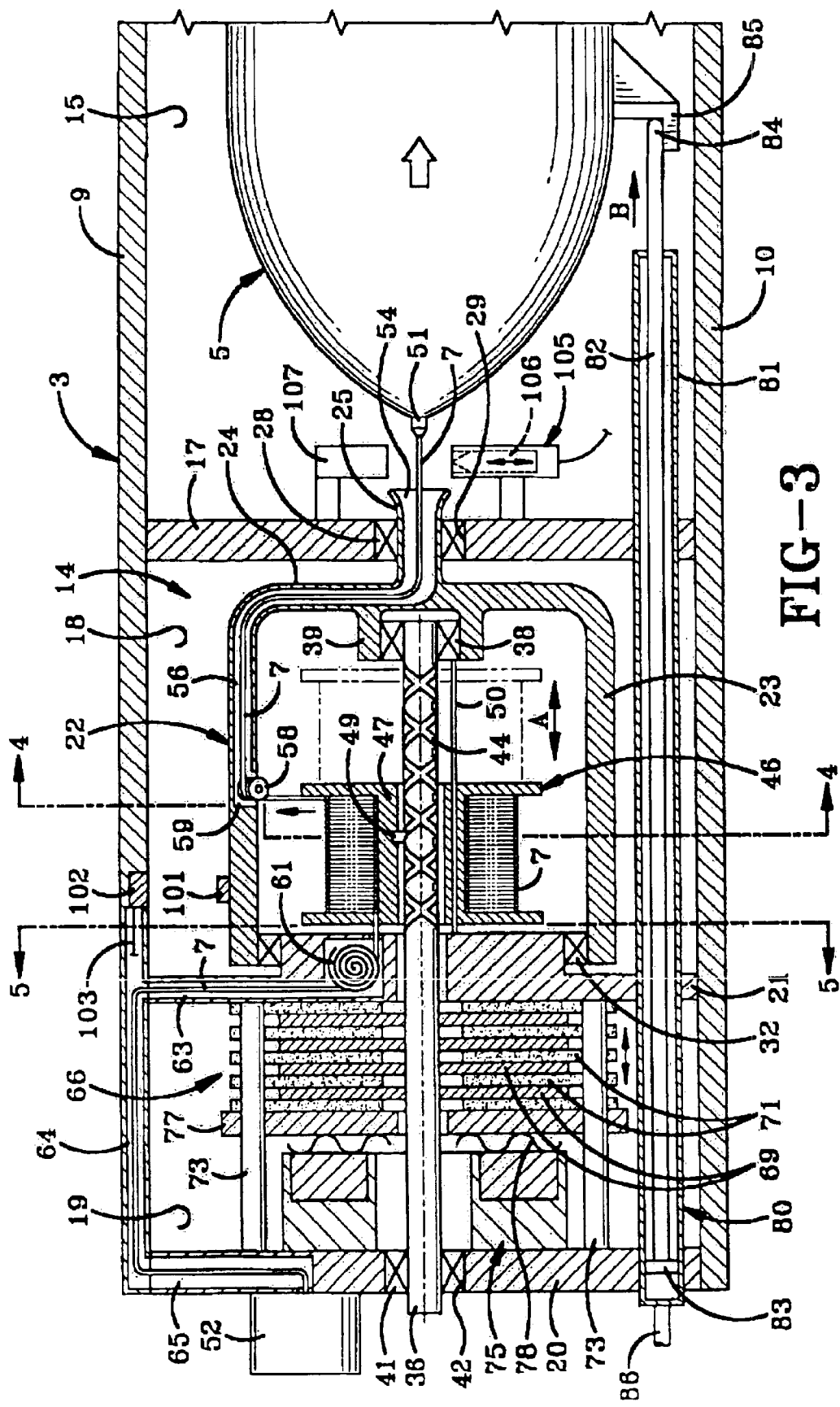
FIG. 3 is an enlarged fragmentary sectional view showing the improved apparatus and system for the high speed electro-optic payout system of the present invention prior to the decoy being deployed.

Housing 3 has top and bottom walls 9 and 10 and spaced side walls 11 and 12 which form a hollow interior 14. As shown in FIG. 3., interior 14 is divided into a decoy storage compartment 15 by a forward bulkhead 17, an apparatus storage chamber 18 formed between forward bulkhead 17 and an intermediate bulkhead 21, and a rear chamber 19 formed between intermediate bulkhead 21 and a rear bulkhead or rear wall 20.

In accordance with one of the features of the invention, a de-bailer indicated generally at 22, is rotatably mounted within chamber 18 by a front bearing 28 which is mounted within an opening 29 formed in front bulkhead 17, and by a rear bearing 32 which is mounted within an open end of the de-bailer and supported on intermediate bulkhead 21. De-bailer 22 preferably has a cup-shaped configuration with a cylindrical side wall 23 and an end wall 24 which terminates in a generally cylindrical-shaped cable discharge portal 25. A shaft 36 extends coaxial with the axis of rotation of de-bailer 22 and is independently rotatably mounted by a front bearing 38 mounted within a cylindrical boss 39 formed on de-bailer end wall 24, and a rear bearing 41 mounted within an opening 42 formed in rear bulkhead 20. Shaft 36 is formed with a double helix 44, the purpose of which is described below.

In further accordance with the invention, a spool 46 is mounted on shaft 36 for reciprocal translating movement therealong as shown by dot dash lines in FIG. 3 and indicated by arrow A. Spool 46 includes a cylindrical hub 47 around which is wrapped a supply of cable 7. Hub 47 is connected to the helix 44 of shaft 36 by a pawl 49 which provides for the reciprocating movement of reel 47 along the shaft as it rotates due to the insertion of pawl 49 into the double helix. An anti-rotational device, such as a rod 50, extends through hub 47 from intermediate bulkhead 21 to further assist in preventing any rotational motion of spool 46 as the cable is being pulled therefrom as described further below. Rod 50 also assists in reducing the force exerted on pawl 49.

In further accordance with the invention, cable 7 extends in a continuous uninterrupted manner from its connection 51 with decoy 5 to a fixed terminus 52 which may be mounted on bulkhead 20 as shown in FIG. 3, or at another fixed location on housing 3 or in aircraft 1. Cable 7 can be connected to the front of decoy 5 as shown in the drawings, or to the lop thereof, or at other locations depending upon the configuration of the decoy without effecting the concept of the invention. A cable discharge opening 54 is formed through portal 25 and communicates with a cable passage 56 formed in a portion of cylindrical side wall 23 and end wall 24 of de-bailer 22. As cable 7 is unwound from spool 46, it passes over a pulley 58 located adjacent an opening 59 which communicates with cable passage 56. A coil spring 61 preferably is mounted within intermediate bulkhead 21 and is operatively engaged with cable 7 to provide a tensioning force thereon to prevent backlash of the cable as it is rapidly unwinding from spool 46. Cable 7 continues from coil spring 61 through a passage 63 formed in intermediate bulkhead 21 and through a passage 64 formed in top wall 9 and passage 65 formed in rear bulkhead 20 for subsequent connection to fixed terminus 52.

A brake mechanism indicated generally at 66, is mounted in rear chamber 19 for engagement with shaft 36. Brake mechanism 66 includes a plurality of rotor plates or discs 69 which are mounted on shaft 36 for rotation therewith. Rotor plates 69 are located between a plurality of spaced stator plates 71 which are slidably mounted on a plurality of spaced rods 73 which extend through aligned holes formed in the stator plates and between intermediate bulkhead 19 and rear wall 20.

A solenoid indicated generally at 75, is magnetically coupled to a plunger or clapper 77 which is slidably mounted on rods 73 in a stacked relationship with stator plates 71. A wave spring 78 is mounted between solenoid 75 and plate 77 maintaining a constant braking force on plunger 77 and the corresponding stator and rotor plates when the solenoid is de-energized. This provides a fail safe brake, that is, the brake is always engaged due to spring 78 until the solenoid is engaged. The details and manner of actuation of brake 66 for determining the length of cable 7, is described in greater detail in U.S. Pat. No. 5,014,997, the contents of which are incorporated herein by reference.

A deployment device indicated generally at 80, is mounted in housing 3 to provide a forceful rapid ejection or deployment of decoy 5 from within housing 3. Deployment device 80 includes a cylinder 81 which contains a piston rod 82 which terminates at one end in a piston 83 and is engaged at its opposite or forward end 84 with a bracket 85 mounted on and extending outwardly from decoy 5. An explosive device (not shown) or other actuation force is mounted within the rear end of cylinder 81 or is supplied thereto through a line 86, to rapidly move piston rod 83 in the direction of arrow B to forcibly and rapidly eject decoy 5 from within chamber 15 of housing 3.

Cable 7 (FIG. 6) may have various constructions, one of which is of the type described in pending application Ser. No. 60/428,156, filed Nov. 21, 2002. This cable will contain a fiber optic signal conductor 88 which includes a glass fiber core 89, an intermediate cushioning layer 90, and an outer protective layer 91. Cable 7 will also contain a plurality of conductors 95, each of which includes a metallic core 96 for transmitting high voltages from terminus 52 to decoy 5, which is surrounded with a pair of di-electric coatings 97 and 98. Other types of voltage conductors and fiber optic conductors could be utilized without affecting the concept of the invention, depending upon the voltage and signals to be supplied to decoy 5. These voltage conductors and fiber optic conductors are all contained within outer protective cover layer 99.

Figure 4:
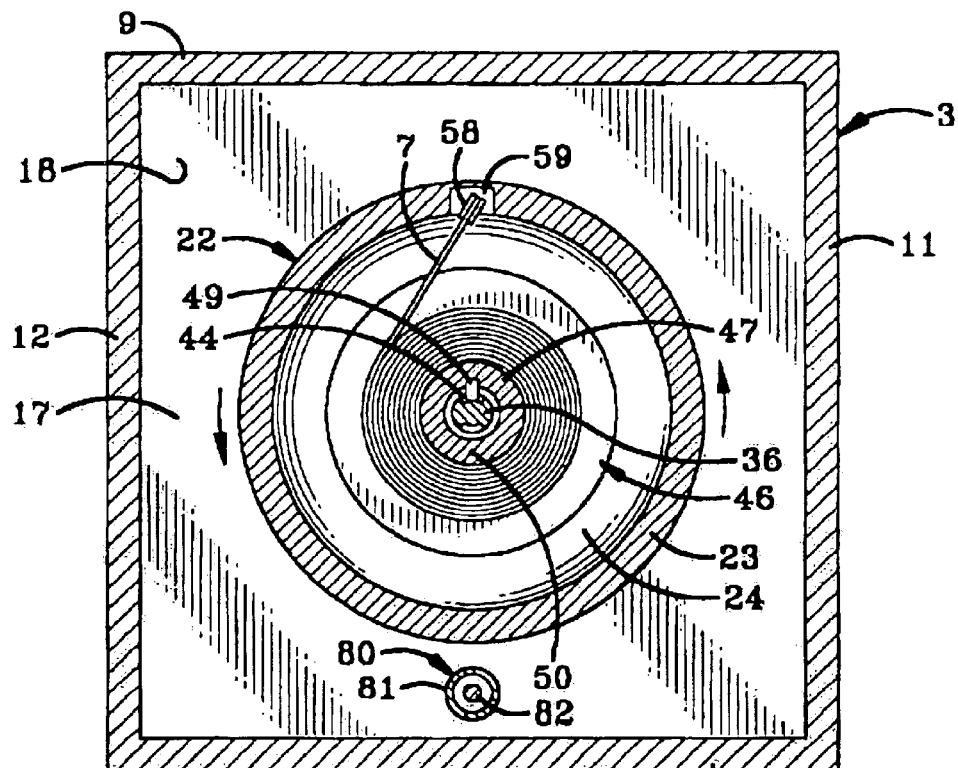
FIG. 4 is an enlarged fragmentary sectional view taken on line 4—4, FIG. 3.
Figure 5:
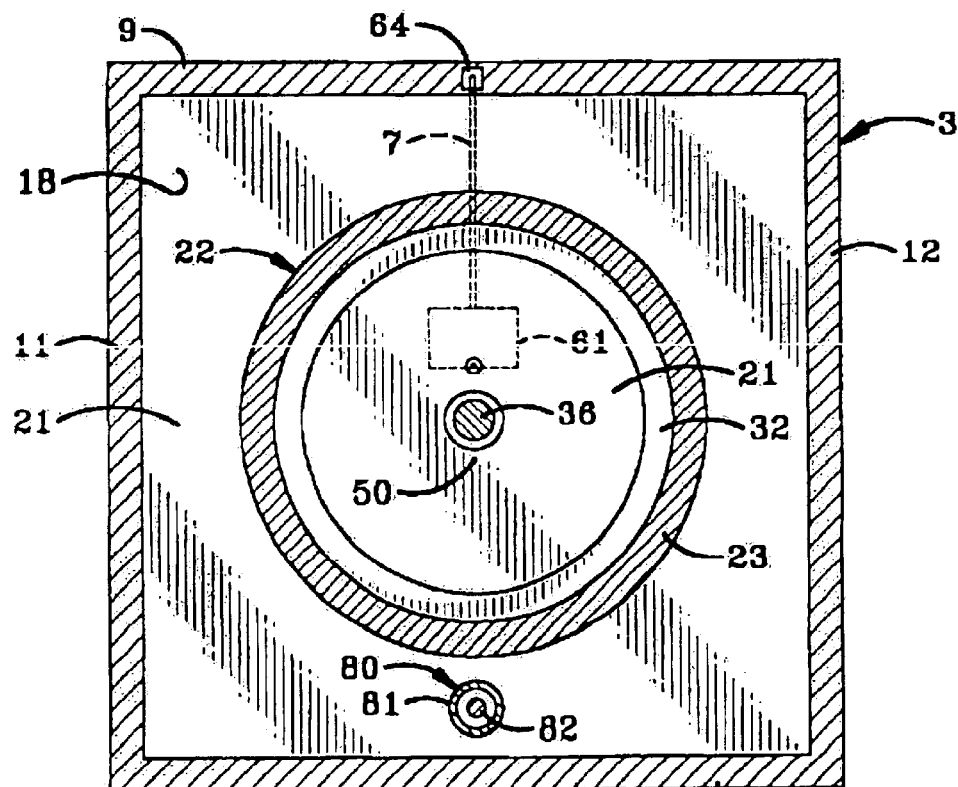
FIG. 5 is an enlarged fragmentary sectional view taken on line 5—5, FIG. 3.

The following is a brief discussion of the operation of the system and apparatus of the present invention. Signal cable 7 is attached to decoy 5 at 51 and extends through cable discharge opening 54 of portal 25, through cable passage 56 and over pulley 58 and through opening 59 and about spool 46. Upon decoy 5 being discharged from housing 3 by deployment mechanism 80, de-bailer 22, which is rotatably supported at its front and rear, rotates and the cable is lifted off and from 46 which oscillates along shaft 36 as shown by arrow A. As the de-bailer rotates, the double helix shaft is driven through its engagement with pawl 49 and advances and retracts spool 46 therealong. This insures that cable 7 is always pulled generally perpendicularly from spool 46 as shown in FIGS. 3–5, to facilitate its unwinding without placing undue stress on cable 7 and pulley 58. The rate of advancement and retardation of cable 7 is set by the pitch of the double helix on shaft 36 which is established by the cable diameter. Shaft 36 is operatively attached and engageable with brake mechanism 66 so that upon decoy 5 reaching its desired location and length, the brake arrests the deployment of decoy 5 which then remains in a stable location at the predetermined distance.

One manner of controlling the length of cable 7 and the positioning of decoy 5 prior to applying the brakes, can be achieved by the use of a magnetic pick-up device. A magnet 101 is mounted on housing side wall 23 and aligns with a pick-up magnet or magnetic sensor 102, which is mounted in housing wall 9. Each rotation of de-bailer 22 is detected by magnetic sensor 102 which sends a signal or pulse through line 103 to terminus 52 or other control apparatus. Upon the desired length of cable being reached, a signal is sent to solenoid 75 which will then actuate brake mechanism 66 by moving plunger 77 toward solenoid 75, which will retard and ultimately stop the rotation of shaft 36, and correspondingly the reciprocal unwinding movement of spool 46 as described in U.S. Pat. No. 5,014,997.

Most importantly, as shown particularly in FIG. 3, cable 7 extends in an interrupted manner continuously from its connection with decoy 5 to terminus 52, eliminating the use of any slip rings or optic rotary joints as herebefore required in order to supply the necessary high voltage and optical signals from terminus 52 to decoy 5. This is achieved by the unique arrangement of de-bailer 22, the rotational mounting of shaft 36 having its double helix 44, the reciprocating non-rotational movement of spool 46 along shaft 36, and the movement of cable 7 through de-bailer 22 and its subsequent connection to fixed terminus 52. Terminus 52 in turn will be connected to the appropriate control mechanism, power sources, and signal generators within the aircraft as set forth in several of the issued patents and pending applications listed above.

Once the decoy has been deployed and has performed its intended function, it can be severed by a severing mechanism indicated generally at 105 (FIG. 3). One type of severing mechanism can include a guillotine blade 106 which is fired by an explosive device (not shown) which immediately severs the cable which extends between blade 106 and an opposed anvil or base 107. Other types of severing mechanisms can be used, or the decoy could be retrieved by various mechanisms shown and described in several of the patents and pending applications set forth above.

Thus, the improved apparatus and system of the present invention provides for a relatively simple, compact, and highly efficient manner for deploying a decoy or other object from a moving vehicle, such as an aircraft, enabling the tow line which contains electro-optic conductors, to extend continuously without interruption from the decoy to a fixed terminus within the aircraft or housing mounted thereon, thereby eliminating any slip rings or fiber optic rotary joints in order to supply the power and signals from the terminus to the decoy through the tow cable. This type of mechanism could be adapted to work on submarines for towing of sonar arrays, and due to the small compact nature of the device, would limit the induced flow noise and hydrodynamic drag.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. Apparatus for deploying a device from a moving object utilizing a towing cable, comprising:

a housing adapted to be mounted on the moving object for storing the device to be developed therefrom;

a cable de-bailer rotatably mounted within the housing having a cable discharge opening;

a shaft independently rotatably mounted within the cable de-bailer;

a spool for storing a length of the towing cable mounted on the shaft for reciprocating movement therealong in response to the cable being unwound from the spool through the discharge opening of the de-bailer as the de-bailer rotates when the device is deployed from the housing; and a brake mechanism operatively engageable with the shaft for retarding deployment of the towing cable and the deployed object.

2. The apparatus as defined in claim 1 wherein the shaft has a double helix and is coupled to the spool through a pawl.

3. The apparatus as defined in claim 1 wherein the cable de-bailer has a cup-shape with a cylindrical side wall and an end wall; in which a cable passage is formed in a portion of the side wall and end wall of the de-bailer; and in which the cable discharge opening is formed in the end wall and communicates with the cable passage.

4. The apparatus as defined in claim 1 including an anti-rotation device operatively connected to the spool to assist in preventing rotation of said spool.

5. The apparatus as defined in claim 4 wherein the anti-rotational device is a rod connected between a hub of the spool and the housing.

6. The apparatus as defined in claim 1 including a magnet mounted on the de-bailer for rotation therewith and a magnetic pick-up device mounted on the housing in alignment with the magnet to determine the rotational speed of the de-bailer.

7. The apparatus as defined in claim 6 wherein a signal is supplied by the magnetic pick-up to a brake control system for actuating the brake mechanism.

8. The apparatus as defined in claim 1 including a deployment mechanism mounted on the housing and operatively engageable with the device to be deployed therefrom, for initiating deployment of said device from the housing.

9. The apparatus as defined in claim 1 including a cable tensioning device for maintaining a retraction tension on the cable to prevent backlash as the cable is being unwound from the spool.

10. The apparatus as defined in claim 9 wherein the cable tensioning device is a coil spring.

11. The apparatus as defined in claim 1 wherein the brake mechanism includes a plurality of rotor plates fixedly mounted on the shaft and a plurality of non-rotational intervening stator plates; and an actuator for moving the intervening stator plates axially along the shaft and into frictional engagement with the rotor plates to control the rotation of said shaft and of the de-bailer.

12. The apparatus as defined in claim 11 wherein the brake mechanism includes a solenoid and a plunger magnetically attracted to the solenoid for moving the stator plates into engagement with the rotor plates.

13. The apparatus as defined in claim 1 wherein the moving object is an aircraft and the cable is an electro-optic cable containing an electrical conductor and a fiber optic conductor.

14. The apparatus as defined in claim 13 wherein the cable extends continuously without interruption from the decoy to a cable terminus adapted to be mounted on the aircraft.

15. A system for protecting an aircraft from a missile attack comprising:
   a decoy adapted to be towed behind the aircraft on a cable;
   a housing adapted to be mounted on the aircraft for storing the decoy;
   a spool for storing a length of the cable located within the housing;
   a de-bailer rotatably mounted within the housing for unwinding the cable from the spool;
   a shaft rotatably mounted within the de-bailer;
   said spool being rotatably fixed on the shaft and reciprocally movable therealong; and
   a brake mechanism for controlling the speed of rotation of the shaft and deployment of the cable from the spool as the decoy is deployed from the housing.

16. The system defined in claim 15 wherein the de-bailer has a substantially cylindrical side wall and an end wall; in which a cable passage is formed in a portion of the side wall and end wall; and in which a cable discharge opening is formed in the end wall and communicates with the cable passage.

17. The system defined in claim 15 wherein the shaft has a double helix and is coupled to the spool through a pawl.

18. The system as defined in claim 15 including a sensor for detecting the speed of rotation of the de-bailer.

19. The system as defined in claim 18 when the sensor includes a magnet mounted on the de-bailer and a magnetic pickup device mounted on the housing for detecting the rotation of said de-bailer.

20. The system defined in claim 15 wherein the cable is an electro-optic cable containing at least one electrical conductor and a fiber optic conductor.

21. The system defined in claim 20 wherein the cable extends continuously without interruption from the decoy to a cable terminus mounted on the aircraft.

22. The system defined in claim 15 wherein a tensioning device is engaged with the cable for maintaining tension on the cable to reduce backlash as the cable is being unwound from the spool.

23. The system defined in claim 15 wherein the brake mechanism includes a plurality of rotor plates fixedly mounted on the shaft and a plurality of non-rotational intervening stator plates; and an actuator for moving the intervening stator plates axially along the shaft and into frictional engagement with the rotor plates to control the rotation of said shaft and of the de-bailer.

24. The system defined in claim 15 wherein the housing has a first compartment for storing the decoy; a second compartment for containing the de-bailer and spool, and a third compartment containing the brake mechanism.

25. The system defined in claim 24 wherein the first and second compartments are separated by a first bulkhead; in which the second and third compartments are separated by a second bulkhead; in which the cable discharge opening is formed by a portal extending outwardly from an end wall of the de-bailer; and in which bearings are mounted on the first and second bulkheads for rotatably mounting the de-bailer therebetween.

26. The system defined in claim 25 wherein one of the bearings extends about the portal and the other of said bearings are mounted within an open end of the de-bailer.

* * * * *

UNITED STATES PATENT AND TRADEMARK OFFICE
CERTIFICATE OF CORRECTION

| | | |
|---|---|---|
| PATENT NO. | : 6,857,596 B1 | Page 1 of 1 |
| APPLICATION NO. | : 10/617545 | |
| DATED | : February 22, 2005 | |
| INVENTOR(S) | : Mark A. Carlson | |

It is certified that error appears in the above-identified patent and that said Letters Patent is hereby corrected as shown below:

On the title page, in section (73), please delete "AE Systems Information and Electronic Systems Integration Inc." and insert therefor --BAE Systems Information and Electronic Systems Integration Inc.--

Signed and Sealed this

Twenty-sixth Day of June, 2012

David J. Kappos
*Director of the United States Patent and Trademark Office*